United States Patent
Ota et al.

(10) Patent No.: US 10,697,097 B2
(45) Date of Patent: Jun. 30, 2020

(54) PREPREG SHEET

(71) Applicant: YUHO CO., LTD., Osaka (JP)

(72) Inventors: Yoshihisa Ota, Osaka (JP); Masaya Matsushita, Osaka (JP); Takeshi Hachimure, Osaka (JP)

(73) Assignee: YUHO CO., LTD., Osaka (JP)

( * ) Notice: Subject to any disclaimer, the term of this patent is extended or adjusted under 35 U.S.C. 154(b) by 47 days.

(21) Appl. No.: 15/774,661

(22) PCT Filed: Nov. 25, 2016

(86) PCT No.: PCT/JP2016/085069
§ 371 (c)(1),
(2) Date: May 9, 2018

(87) PCT Pub. No.: WO2017/090758
PCT Pub. Date: Jun. 1, 2017

(65) Prior Publication Data
US 2018/0327946 A1    Nov. 15, 2018

(30) Foreign Application Priority Data

Nov. 27, 2015  (JP) .................. 2015-232227
Nov. 22, 2016  (JP) .................. 2016-226768

(51) Int. Cl.
*B32B 7/02*       (2019.01)
*D04H 1/4242*   (2012.01)
(Continued)

(52) U.S. Cl.
CPC ......... *D04H 1/4242* (2013.01); *B29B 15/105* (2013.01); *C08J 5/042* (2013.01);
(Continued)

(58) Field of Classification Search
CPC . B29B 15/105; C08J 2323/12; C08J 2369/00; C08J 2377/00; C08J 2379/08;
(Continued)

(56) References Cited

U.S. PATENT DOCUMENTS

| 4,229,397 A | 10/1980 | Fukuta et al. |
| 2013/0210298 A1 | 8/2013 | Ortlepp et al. |
| 2016/0362817 A1 | 12/2016 | Ortlepp et al. |

FOREIGN PATENT DOCUMENTS

| JP | 62-1969 | 1/1987 |
| JP | 1-118655 | 5/1989 |

(Continued)

OTHER PUBLICATIONS

Shinjo et al (JP 2002212311 (A) machine translation), Jul. 31, 2002. (Year: 2002).*

(Continued)

*Primary Examiner* — Lawrence D Ferguson
(74) *Attorney, Agent, or Firm* — Wenderoth, Lind & Ponack, L.L.P.

(57) ABSTRACT

The prepreg sheet, which is an intermediate of molded articles, has a nonwoven fabric having carbon fibers and thermoplastic resin fibers, wherein the prepreg sheet has a thickness expansion rate of 250% or less after being heated for 90 seconds at a temperature of the melting point of the thermoplastic resin fiber to the melting point+100° C.

7 Claims, 11 Drawing Sheets

(51) Int. Cl.
*C08J 5/24* (2006.01)
*C08J 5/04* (2006.01)
*B29B 15/10* (2006.01)
*D04H 1/4291* (2012.01)
*D04H 1/4334* (2012.01)

(52) U.S. Cl.
CPC .............. *C08J 5/24* (2013.01); *D04H 1/4291* (2013.01); *D04H 1/4334* (2013.01); *C08J 2323/12* (2013.01); *C08J 2369/00* (2013.01); *C08J 2377/00* (2013.01); *C08J 2379/08* (2013.01); *C08J 2381/04* (2013.01); *C08J 2481/02* (2013.01)

(58) Field of Classification Search
CPC .... C08J 2381/04; C08J 2481/02; C08J 5/042; C08J 5/24; D04H 1/4242; D04H 1/4291; D04H 1/4334

See application file for complete search history.

(56) References Cited

FOREIGN PATENT DOCUMENTS

| | | |
|---|---|---|
| JP | 10-314519 | 12/1998 |
| JP | 2002-212311 | 7/2002 |
| JP | 2008-81872 | 4/2008 |
| JP | 2012-109452 | 6/2012 |
| JP | 2013-519546 | 5/2013 |
| JP | 2014-051555 | 3/2014 |
| JP | 2014-65831 | 4/2014 |

OTHER PUBLICATIONS

International Search Report dated Feb. 28, 2017 in International (PCT) Application No. PCT/JP2016/085069.
Extended European Search Report dated Aug. 9, 2019, in corresponding European Patent Application No. 16868701.0.
Notification of Reasons for Rejection dated Aug. 20, 2019 in corresponding Japanese Patent Application No. 2015-232227, with English-language translation.
Office Action dated Feb. 12, 2020 in corresponding Japanese Patent Application No. 2015-232227, with English translation.

* cited by examiner

PREPREG SHEET

TECHNICAL FIELD

The present invention relates to a prepreg sheet, which is an intermediate of molded articles, comprising a nonwoven fabric comprising carbon fibers and thermoplastic resin fibers.

BACKGROUND ART

Carbon fibers, generally made of acrylic fibers or pitch (by-products of petroleum oil, coal, coal tar, and the like) carbonized at high temperatures, are obtained by heating and carbonizing precursors of organic fibers, and defined as the fibers composed of carbon in the ratio of 90% or more according to Japanese Industrial Standards (JIS). Because the carbon fibers have lower dispersibility than other fibers and each fiber of the carbon fibers is entangled with each other weakly, they are scarcely used to form nonwoven fabrics as the only material, but are usually used as a composite material with resin fibers such as synthetic resin.

For example, Patent Document 1 discloses a method, wherein carbon fibers of 20 to 70% by weight and binder fibers of 30 to 80% by weight are mixed to form nonwoven fabrics, and then the nonwoven fabrics are burnt for removal of the binder fibers to obtain nonwoven fibers composed of the carbon fibers.

Another method is also known, which is to produce nonwoven fabrics by increasing tangles of carbon fibers with thermoplastic resin fibers, wherein staple-like short fibers of the carbon fibers and the thermoplastic resin fibers are blended to make a sheet, and the sheet is laminated, and then the carbon fibers and the thermoplastic resin fibers are entangled by a needle punch method (for example, see EXAMPLES of Patent Document 2).

RELATED ART DOCUMENTS

Patent Documents

Patent Document 1: JP-A-10-314519
Patent Document 2: JP-A-2008-081872

SUMMARY OF THE INVENTION

Problems to be Solved by the Invention

Nonwoven fabrics consisting of carbon fibers are obtained by the method disclosed in Patent Document 1, however, the nonwoven fabrics have a weakness that they are easy to fray because of their weak tangle force, and the carbon fibers, that are broken and shorten during processing, are easy to fall off.

The nonwoven fabrics obtained by entanglement of carbon fibers and thermoplastic resin fibers have another weakness. In the method, after spreading carbon fiber bundles and blending the spread carbon fibers and the thermoplastic resin fibers, and then sheeting thereof, the carbon fibers and the thermoplastic resin fibers are entangled by needle punching to obtain nonwoven fabrics. When the nonwoven fabrics are heated and pressed to obtain molded articles, the thermoplastic resin fibers in the nonwoven fabrics melt and tend to spread. In addition, a prepreg sheet obtained by heating and pressing the nonwoven fabrics is tend to expand in the thickness direction because of the force of the carbon fibers to return to their original place before spreading.

Furthermore, in cases where the prepreg sheet that tend to expand in the thickness direction is used to produce molded articles, it is difficult to insert the prepreg sheet into a mold, which leads to impossibility of obtaining desirable molded articles.

The present invention has been made by focusing on the problems in the related art, and an object thereof is to provide a prepreg sheet that permits desirable molded articles by suppressing expansion in the thickness direction even after heated so that it can be inserted into a mold smoothly.

Means for Solving the Problems

The prepreg sheet that can solve the problem mentioned above is an intermediate of molded articles and comprises a nonwoven fabric comprising carbon fibers and thermoplastic resin fibers, wherein the prepreg sheet has a thickness expansion rate of 250% or less after being heated for 90 seconds at a temperature of the melting point of the thermoplastic resin fiber to the melting point+100° C.

The prepreg sheet preferably has a density of marks made by needle punching of 5 punches/cm$^2$ or less.

The prepreg sheet preferably has a density of the carbon fibers having a displacement amount of 1 mm or more of 100 threads/cm$^2$ or less in a cross section of the prepreg sheet, wherein the displacement amount is a gap in the thickness direction between one portion and another portion of a carbon fiber selected from one of the carbon fibers.

The prepreg sheet preferably has a basis weight of 100 to 1500 g/m$^2$, and a thickness of 0.5 to 6.0 mm.

In the prepreg sheet, the average fiber length of the carbon fibers is preferably 15 to 100 mm, and the average fiber length of the thermoplastic resin fibers is preferably 25 to 100 mm.

In the prepreg sheet, the thermoplastic resin fibers can be selected from polypropylene fibers, polyamide fibers, polycarbonate fibers, polyphenylene sulfide fibers, and polyetherimide fibers.

In the prepreg sheet, the carbon fibers and the thermoplastic resin fibers are mixed with preferably in the mass ratio of 20:80 to 80:20.

Effects of the Invention

Because a prepreg sheet of the present invention has a thickness expansion rate of 250% or less after the heat treatment that is applied after prepreg forming and before molding (hereinafter, referred as "pre-molding treatment"), the prepreg sheet can control expansion in the thickness direction which occurs if a conventional prepreg sheet is used. In a conventional prepreg sheet, entangled thermoplastic resin fibers melt in the heat treatment and then spread and return to their original place before entangled, and the sheet expands in the thickness direction.

MODE FOR CARRYING OUT THE INVENTION

Hereinafter, the prepreg sheet of the present invention will be described in more detail with reference to the figures.

After examining the conditions where the prepreg sheet expands during the pre-molding treatment to obtain molded articles, the present inventors have succeeded to obtain the prepreg sheet which thickness expansion rate is 250% or less after the pre-molding treatment (specifically, for 90 seconds at a temperature in the range of the melting point of the thermoplastic resin fibers to the melting point+100° C.). This makes it possible to control the thickness expansion of the prepreg sheet after the pre-molding treatment and to insert the prepreg sheet into a mold smoothly and to obtain desirable molded articles. By the way, the thickness expansion rate needs not be 250% or less at all temperatures in the range mentioned above, but should be 250% or less at any one of temperatures in the range.

The prepreg sheet of the present invention preferably has 5 punches/cm$^2$ or less marks made by needle punching, which is generally used to entangle carbon fibers with thermoplastic resin fibers. More preferably, it has 3 punches/cm$^2$ or less, and most preferably, it has 2 punches/cm$^2$ or less. In cases where the number of marks made by needle punching is 5 punches/cm$^2$ or less, carbon fibers do not tangle with thermoplastic resin fibers well, which means that the resilience of the carbon fibers to spread is small and thus the prepreg sheet does not expand in the thickness direction.

Furthermore, in cross-section of the prepreg sheet of the present invention, the density of the carbon fibers having a displacement amount of 1 mm or more is preferably 100 threads/cm$^2$ or less, wherein the displacement amount is a gap in the thickness direction between one portion and another portion of a carbon fiber selected from one of the carbon fibers, more preferably 50 threads/cm$^2$ or less, and even more preferably 20 threads/cm$^2$ or less. In cases where the density of the carbon fiber having a displacement amount of 1 mm or more in the thickness direction is 100 threads/cm$^2$ or less, the number of the carbon fibers oriented in the thickness direction of the sheet is small, and as a result entanglement of the carbon fibers with the thermoplastic resin fibers is suppressed, which means that thickness expansion of the prepreg sheet is controlled.

Prepreg, which is a partially cured sheet-like intermediate of molded articles and is generally obtained by impregnating carbon fibers with thermosetting resin or thermoplastic resin, is known as a good material for molding that enables the molded articles to have stable qualities. Recently, from the viewpoint of mass production, reduction in molding time, and reduction in equipment expenses, the prepreg sheet obtained by mixing carbon fibers with thermoplastic resin fibers has been gaining attention, which is used for aerospace industry requiring weight saving and high efficiency, automobile parts industry, and sports industry.

Carbon fibers are generally fibers made by carbonizing acrylic fibers or pitch (by-products of petroleum oil, coal, coal tar, and the like) at high temperatures, and according to Japanese Industrial Standards (JIS), defined as the fibers composed of carbon in the ratio of 90% or more that is obtained by heating and carbonizing a precursor of organic fibers. By classification, carbon fibers made from acrylic fibers are called Polyacrylonitrile (PAN) type, and carbon fibers made from pitch are called PITCH type.

As mentioned above, since carbon fibers have weaker dispersibility and tangle force than any other fibers, they are rarely used as the only material to form nonwoven fabrics, and usually blended with resin fibers such as synthetic resin to be used as a composite material. The carbon fibers that are used to obtain the prepreg sheet in the present invention are also used as a composite material with thermoplastic resin fibers.

In embodiments of the present invention, both PAN type and PITCH type can be used, however, PAN type is more preferable from the viewpoint of dispersion of carbon fibers with thermoplastic resin fibers.

The average fiber length of the carbon fibers is preferably 15 to 100 mm, more preferably 20 to 80 mm, and even more preferably 30 to 70 mm. In cases where the average fiber length of the carbon fibers is 15 mm or more, mechanical strength of a prepreg sheet made of nonwoven fabrics comprising the carbon fibers and thermoplastic resin fibers is easily improved. In addition, in cases where the average fiber length of the carbon fibers is 100 mm or less, dispersion of the carbon fibers with thermoplastic resin fibers in the nonwoven fabrics is improved, so that homogeneous nonwoven fabrics are easily obtained.

Thermoplastic resin fiber that is used as a source of resin fiber is not particularly designated, provided that it is elastic and less likely to change its shape at ordinary temperatures and softened by heating to form molded articles into a desirable shape. Specifically, from considerations of productivity and cost of raw materials, it is preferably selected from polypropylene, polyamide, polycarbonate, polyphenylene sulfide, and polyetherimide. Additionally, the average fiber length of the thermoplastic resin fibers is preferably 25 to 100 mm, more preferably 30 to 80 mm, and even more preferably 40 to 70 mm. In cases where the average fiber length of the thermoplastic resin fibers is 25 mm or more, mechanical strength of a prepeg sheet made of nonwoven fabrics comprising carbon fibers and the thermoplastic fibers is improved. In addition, in cases where the average fiber length of the thermoplastic resin fibers is 100 mm or less, dispersion of the thermoplastic resin fibers with carbon fibers in the nonwoven fabrics is improved, so that homogeneous nonwoven fabrics are easily obtained. As for fineness, the fineness of 2.2 to 22 dtex is preferable, more preferably 2.2 to 20 dtex, and even more preferably 2.2 to 15 dtex. In cases where the fineness is 2.2 dtex or more and 22 dtex or less, homogeneous nonwoven fabrics are easily obtained because the carbon fibers and the thermoplastic resin fibers in the nonwoven fabrics disperse well.

The mass ratio of carbon fibers to thermoplastic resin fibers is preferably from 20:80 to 80:20. In cases where the mass ratio of carbon fibers is 80% by mass or less or 20% by mass or more, the thermoplastic resin fibers melt enough during the heat and pressure treatment after forming nonwoven fabrics, so that the prepreg sheet easily keeps its shape.

In embodiments of the present invention, from considerations of workability in producing molded articles such as automobile parts, a basis weight and a thickness of the prepreg sheet are preferably 100 to 1500 g/m$^2$ and 0.5 to 6.0 mm respectively, more preferably 250 to 1200 g/m$^2$ and 1.0 to 5.0 mm, and even more preferably 500 to 1000 g/m$^2$ and 2.0 to 4.5 mm.

Next, as for the process of producing the prepreg sheet of the present invention and the process of obtaining molded articles made from the prepreg sheet, an example will be described referring to FIG. 1 and FIG. 2.

Figure 1:
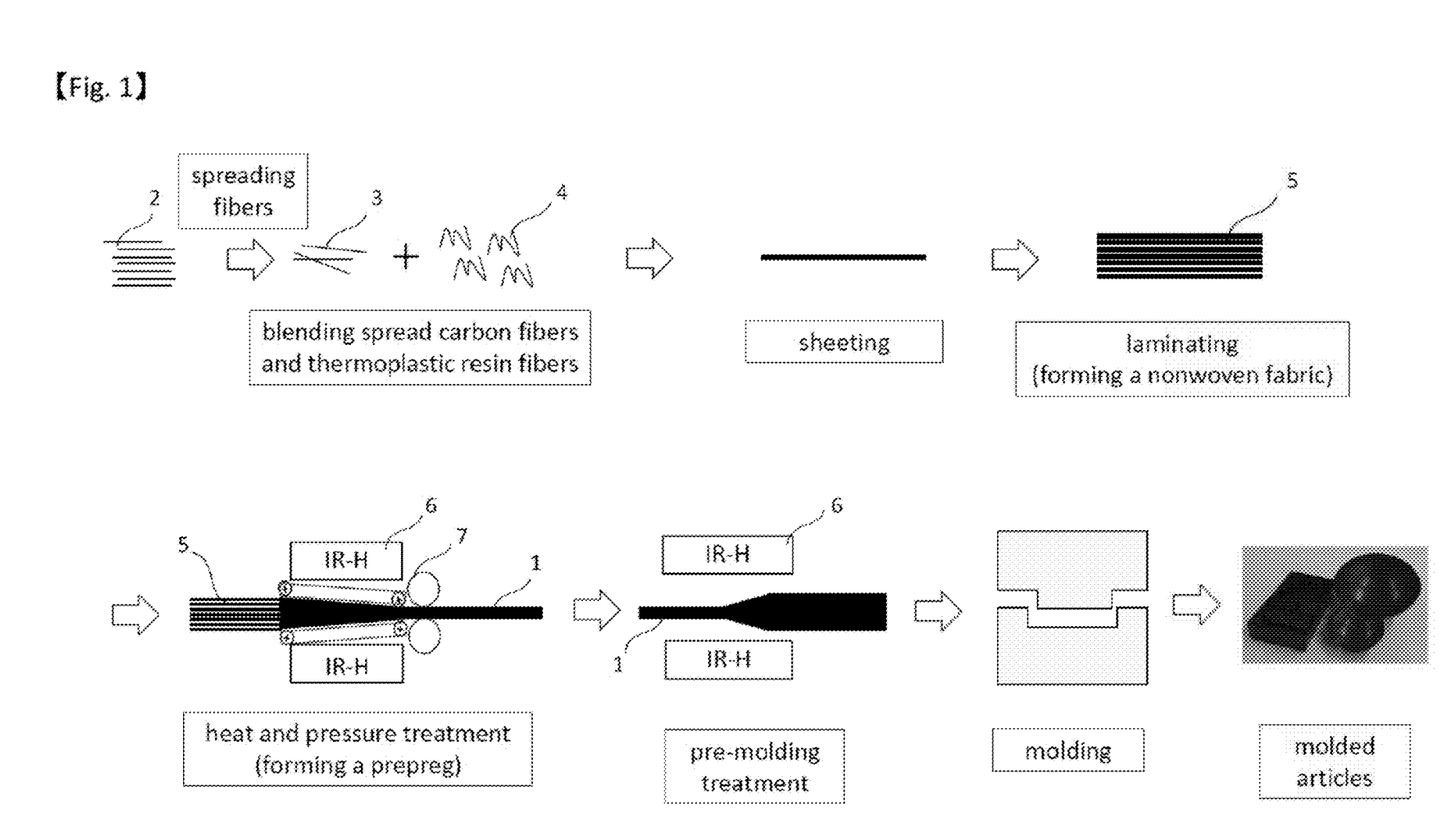
FIG. 1 is a schematic illustration showing one example of the process of producing a prepreg sheet and molded articles from the prepreg sheet in accordance with an embodiment of the present invention.
Figure 2:
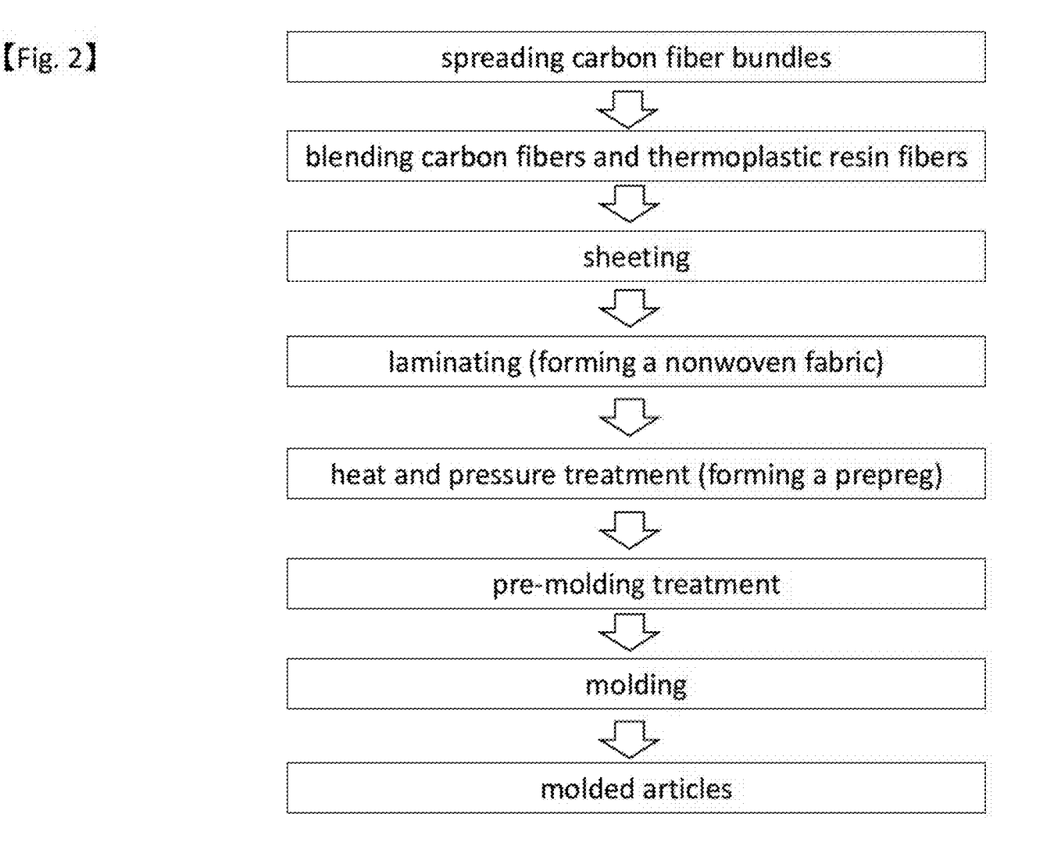
FIG. 2 is a flowchart showing one example of the process of producing a prepreg sheet and molded articles from the prepreg sheet in accordance with an embodiment of the present invention.

FIG. 1 is a schematic illustration showing one example of the producing process of a prepreg sheet and molded articles made from the prepreg sheet in accordance with an embodiment of the present invention. FIG. 2 is a flowchart showing one example of the process in which carbon fiber bundles are broken up to begin with, and the carbon fibers and the thermoplastic resin fibers are blended and sheeted, and next, the sheet is laminated to obtain nonwoven fabrics, and then the nonwoven fabrics are treated to form prepreg sheet, and finally molded articles are obtained from the prepreg sheet.

Prepreg sheet 1 of the present invention is obtained by the process in which thermoplastic resin fibers 4 and carbon fibers 3, that are obtained by breaking carbon fiber bundles 2, are blended to make a sheet in a desired mass ratio (for example, 40% by mass of carbon fibers and 60% by mass of thermoplastic resin fibers), and laminating thereof to obtain nonwoven fabrics 5, and then applying heat and pressure treatment (for example, 240° C., 90 seconds, 1 MPa, in a case where polypropylene is used as a source of thermoplastic resin fiber) to the nonwoven fabrics 5. The process is controlled to make the prepreg sheet 1 to have desired basis weight and thickness (for example, 250 g/m$^2$ and 0.5 to 6.0 mm, respectively). The pre-molding treatment (for example, 240° C., 90 seconds in a case where polypropylene is used as a source of thermoplastic resin fiber) is applied to prepreg sheet 1 so that it is inserted into a mold smoothly in the following process.

As the method for blending thermoplastic resin fibers 4 and carbon fibers 3 that are obtained by breaking carbon fiber bundles 2, and sheeting and laminating thereof, a conventionally known method can be used. For example, commercially available blender machines can be used for blending, and sheeting and laminating can be done by a carding method with commercially available carding machines.

The method for heating and pressing resultant nonwoven fabric 5 is not specially limited, and methods known in the art can be used. For example, from the viewpoint of operability and versatility, the nonwoven fabric is heated and pressed preferably by belt-press 7 in infrared heating furnace 6, but other methods of heating by commercially available heat-through or ovens are also available. A heating temperature is, taking the melting point of the thermoplastic resin fibers into consideration, preferably from the melting point of the thermoplastic resin fibers to the melting point+100° C., more preferably from the melting point+20° C. to the melting point+100° C., even more preferably from the melting point+40° C. to the melting point+100° C. A heating time is preferably 30 to 300 seconds, more preferably 60 to 240 seconds, and even more preferably 60 to 180 seconds. A pressure force is, taking uniformity and post-treatment strength of carbon fibers and thermoplastic resin fibers into consideration, preferably 0.1 to 10 MPa, more preferably 0.5 to 10 MPa, and even more preferably 1 to 10 MPa.

Before molding, the pre-molding treatment is applied to prepreg sheet 1 at predetermined temperatures and for predetermined seconds in infrared heating furnace 6. Specifically, the heating temperature is preferably from the melting point of the thermoplastic resin fibers to the melting point+100° C., more preferably from the melting point+20° C. to the melting point+100° C., even more preferably from the melting point+40° C. to the melting point+100° C. The heating time is preferably 90 seconds.

This application claims the benefit of priority based on Japanese Patent Application No. 2015-232227 filed on Nov. 27, 2015, and Japanese Patent Application No. 2016-226768 filed on Nov. 22, 2016, and the entire contents of the specifications of which are incorporated herein by reference.

EXAMPLES

Hereinafter, the present invention will be described in more detail with reference to examples. The present invention is not to be limited by the following examples, and can be naturally practiced with suitable modifications in the scope in accordance with the spirit described above and below. The present invention includes all of the modifications within its technical scope.

(Production of Nonwoven Fabrics)

40% by mass of PAN type carbon fibers (manufactured by Toray) that is obtained by breaking the carbon fiber bundles and has the average fiber length of 48 mm and 60% by mass of polypropylene (manufactured by Daiwabo) that has the average fiber length of 51 mm and the melting point of 168° C. were blended by a commercially available blender, and then the blended fibers were sheeted and laminated by a commercially available carding machine to obtain a nonwoven fabric.

(Heat/Pressure Treatment)

The nonwoven fabric obtained by the process mentioned above was fed to a belt press machine and treated in a commercially available infrared heating furnace to obtain a prepreg sheet. The resultant prepreg sheet is the present invention. The prepreg sheet had a basis weight of 250 g/m$^2$ and a thickness of 1.3 mm. The treatment was applied under the condition in which the heating temperature was 240° C., the heating time was 90 seconds, and the pressure was 1 MPa.

To obtain a comparative example, a nonwoven fabric prepared by the process mentioned above was entangled with a commercially available needle punching machine after sheeted and laminated, in which process the needle punched on the both sides of the sheet and the needle density (the number of needle punching per unit area of the nonwoven fabric) was 30 punches/cm$^2$. The method for obtaining the comparative example was the same as the present invention except the needle punching process.

(Pre-Molding Treatment)

Pre-molding treatment was applied to the respective prepreg sheets obtained by the process mentioned above by treating in a commercially available infrared heating furnace under the condition in which the heating temperature was 240° C. (equal to the melting point of polypropylene+72° C.), and the heating time was 90 seconds. Then, the number of marks made by needle punching per unit area in the treated prepreg sheets was counted from visual observation. The number of marks of the prepreg sheet of the present invention and the comparative example were 0 punches/$cm^2$, and 30 punches/$cm^2$ respectively.

(Observation of the Prepreg Sheet in a Cross Section Before/after the Pre-Molding Treatment)

A cross section of the prepreg sheets obtained by the process mentioned above was observed with an optical microscope (KEYENCE VHX-900), and the state of fiber entanglement of the carbon fibers with the thermoplastic resin fibers was examined.

Figure 3:
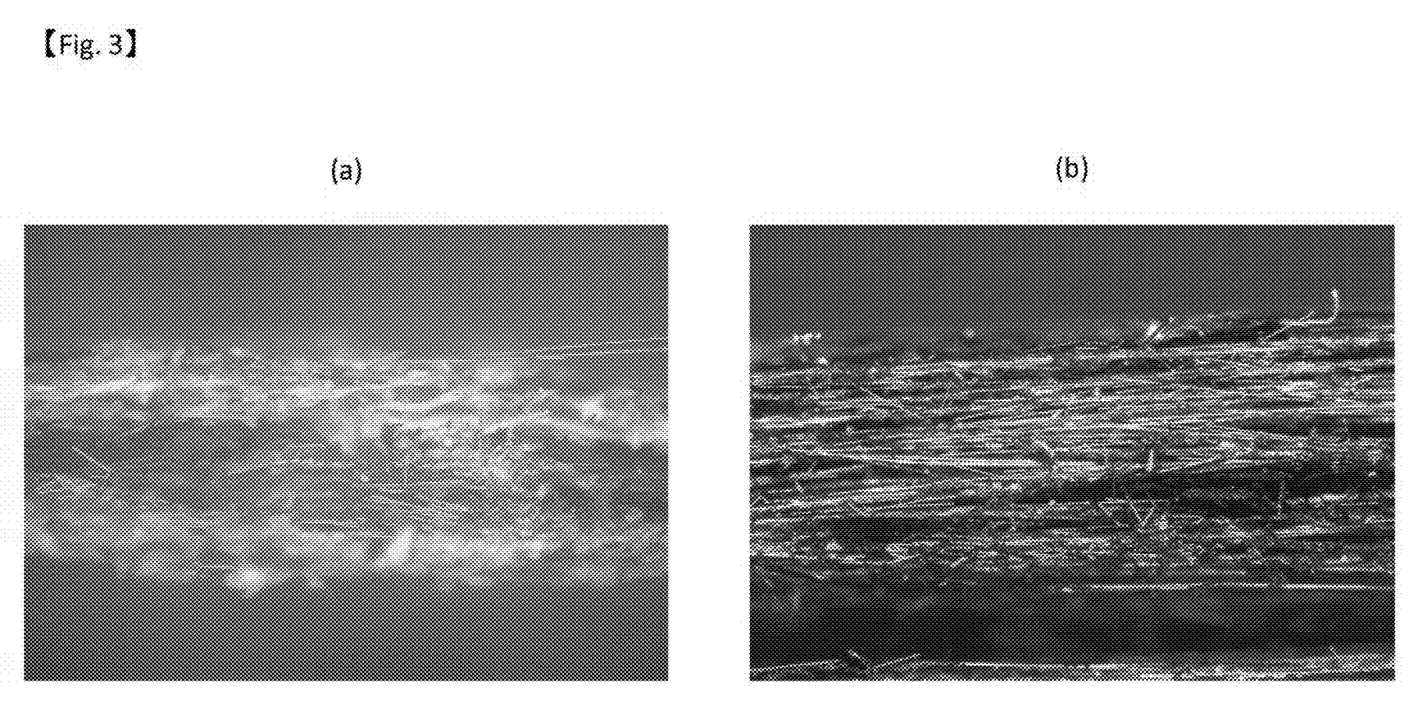
FIG. 3 is cross-sectional photographs of a prepreg sheet in accordance with an embodiment of the present invention. (a) is a cross-sectional photograph taken before the pre-molding treatment. (b) is a cross-sectional photograph taken after the pre-molding treatment.
Figure 4:
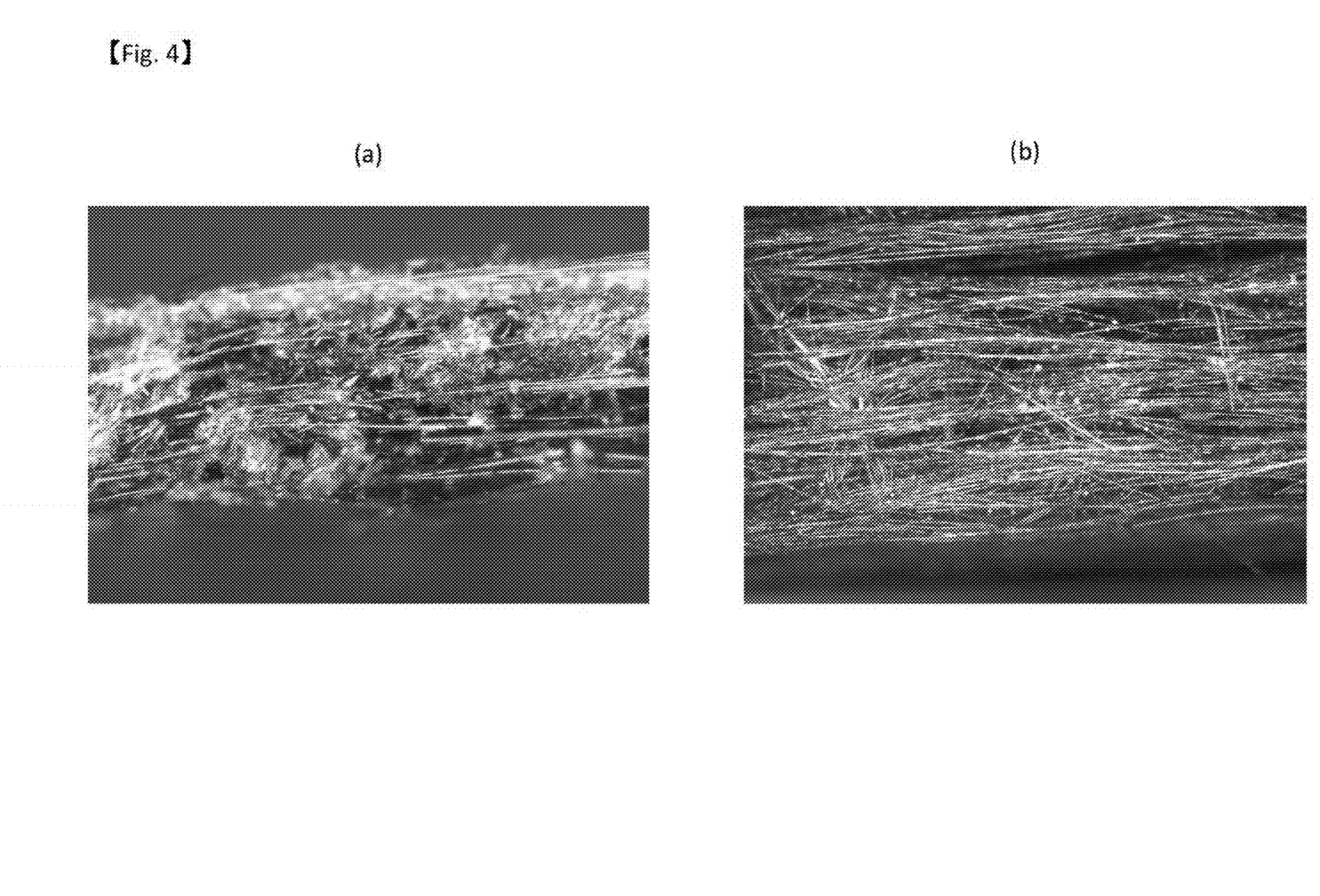
FIG. 4 is cross-sectional photographs of a prepreg sheet processed by a conventional needle punch method. (a) is a cross-sectional photograph taken before the pre-molding treatment. (b) is a cross-sectional photograph taken after the pre-molding treatment.
Figure 5:
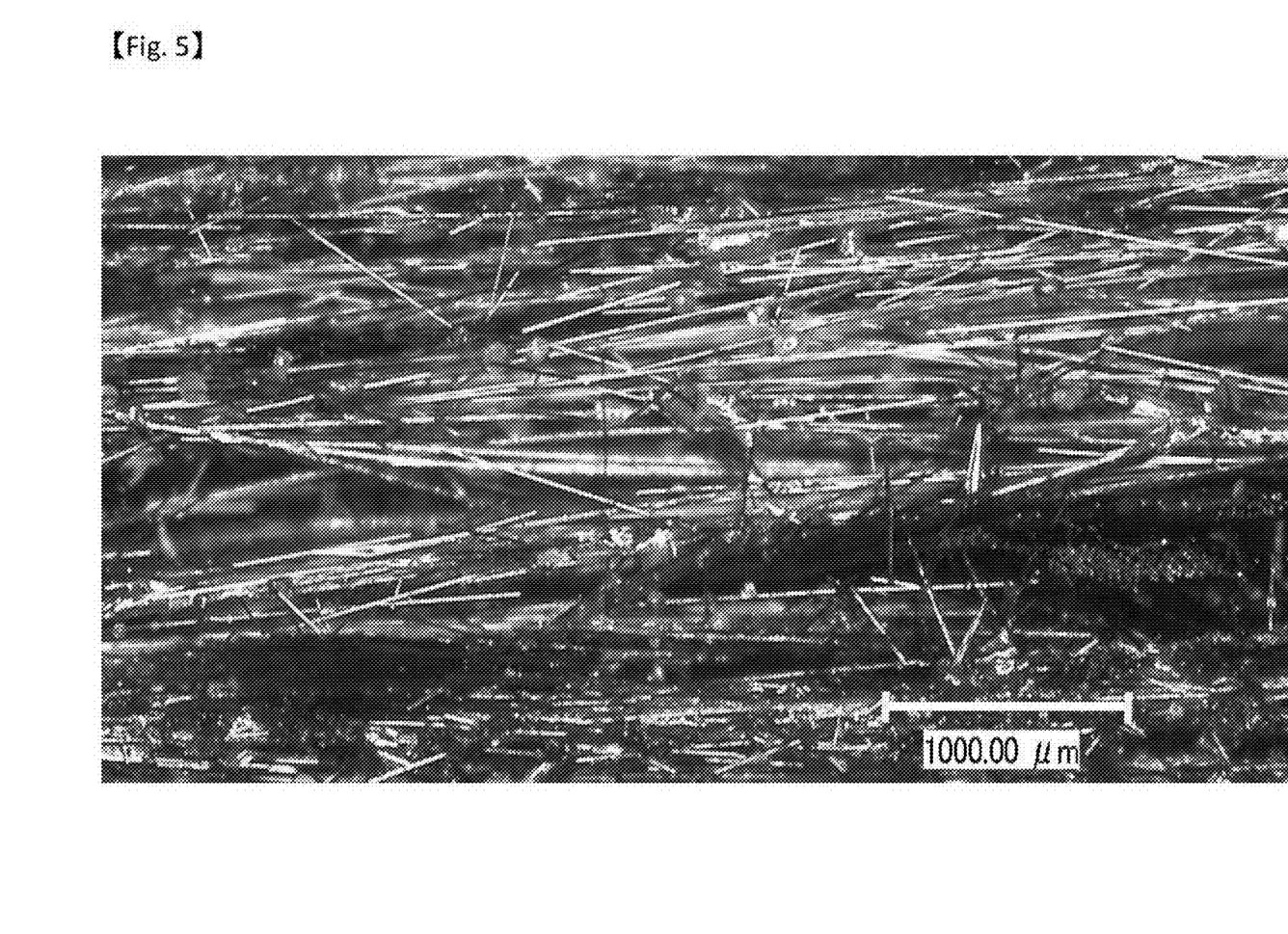
FIG. 5 is an enlarged cross-sectional photograph of a prepreg sheet in accordance with an embodiment of the present invention after the pre-molding treatment.
Figure 6:
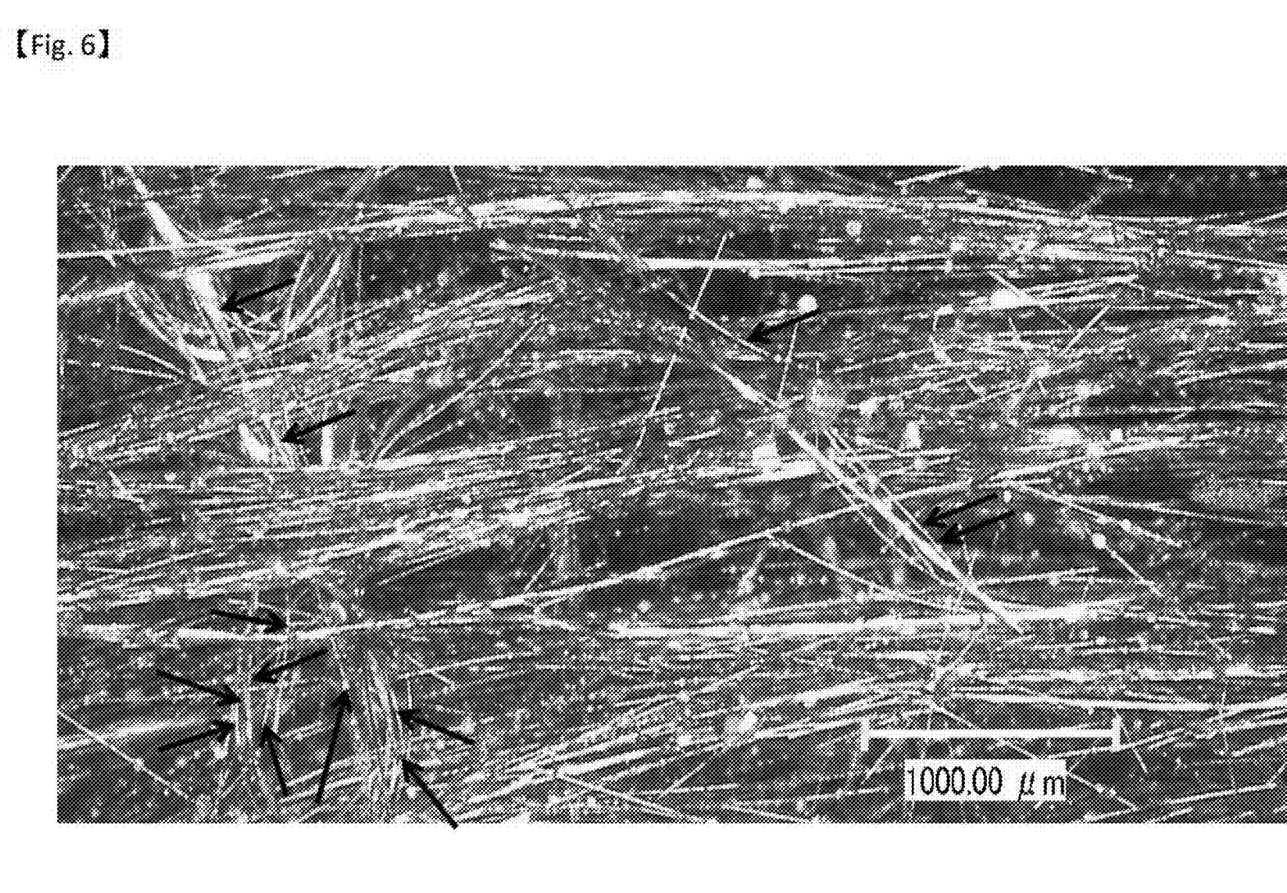
FIG. 6 is an enlarged cross-sectional photograph of a prepreg sheet, after the pre-molding treatment, processed by a conventional needle punch method.

FIG. 3 and FIG. 4 are cross-sectional photographs of the prepreg sheet of the present invention and the comparative example respectively. (a) was taken before the pre-molding treatment, and (b) was taken after the pre-molding treatment. FIG. 5 is an enlarged cross-sectional photograph of the prepreg sheet of the present invention after the pre-molding treatment (lens magnification: 30 times, view area: 3 mm×5 mm), while FIG. 6 is an enlarged cross-sectional photograph of the prepreg sheet of the comparative example after the pre-molding treatment (lens magnification: 30 times, view area: 3 mm×5 mm).

FIG. 3 and FIG. 5 show that the fibers in the cross section of the prepreg sheet of the present invention did not tangle in the thickness direction both before and after the pre-molding treatment. On the other hand, FIG. 4 and FIG. 6 show that the prepreg sheet of the comparative example had carbon fibers (see arrows in FIG. 6) that had a displacement amount of 1 mm or more in the cross section, wherein the displacement amount was a gap in the thickness direction between one portion and another portion of a carbon fiber selected from one of the carbon fibers, which meant that the carbon fibers tangled with the thermoplastic resin fibers, and the entanglement was kept after the pre-molding treatment.

(Measurement of the Apparent Rate of Thickness Change Before/after the Pre-Molding Treatment)

The apparent thickness of the prepreg sheet of the present invention and the prepreg sheet of the comparative example before/after the pre-molding treatment was measured by a commercially available thickness gauge to determine the apparent rate of thickness change (thickness expansion rate). Table 1 shows the result.

TABLE 1

| | before treatment (mm) | after treatment (mm) | thickness expansion rate (%) |
|---|---|---|---|
| No. 1 | 1.4 | 3.2 | 226.4 |
| No. 2 | 1.2 | 2.5 | 217.1 |
| No. 3 | 1.2 | 2.5 | 203.3 |
| No. 4 | 1.3 | 2.5 | 198.4 |
| No. 5 | 1.4 | 2.4 | 176.6 |
| No. 6 | 1.2 | 2.2 | 182.1 |
| No. 7 | 1.4 | 9.8 | 709.4 |
| No. 8 | 1.4 | 10.3 | 727.7 |
| No. 9 | 1.5 | 7.7 | 502.6 |
| No. 10 | 1.6 | 7.2 | 454.5 | before treatment: before the pre-molding treatment
after treatment: after the pre-molding treatment Table 1 shows that the prepreg sheets of the present invention (No. 1 to 6) had the thickness expansion rate of 176.6 to 226.4% after the pre-molding treatment, which was smaller than one of the prepreg sheets of the comparative examples (No. 7 to 10). The thickness expansion rate of the prepreg sheets of the comparative examples (No. 7 to 10) after the pre-molding treatment was 452.5 to 727.7%, which meant that expansion of the comparative examples after the pre-molding treatment could not be controlled.

(Examination of Needle Density)

Prepreg sheets were produced by following the process for producing the nonwoven fabrics of the present invention mentioned above except varying the needle density of the sheeted and laminated fabrics with a commercially available needle punching machine. By analyzing these samples, the effect of the needle density upon the thickness expansion rate of the prepreg sheet was examined. The needle density was determined by the following steps: cutting out a piece of the prepreg sheet treated by predetermined needle punching with a utility knife; observing the piece with an optical microscope just like the observation of a cross section before/after the pre-molding treatment mentioned above; from the results of the observation, counting the number of threads of carbon fibers which one portion and another portion of the same thread had a gap of 1 mm or more in the thickness direction in a cross section of the prepreg sheet.

Figure 7:
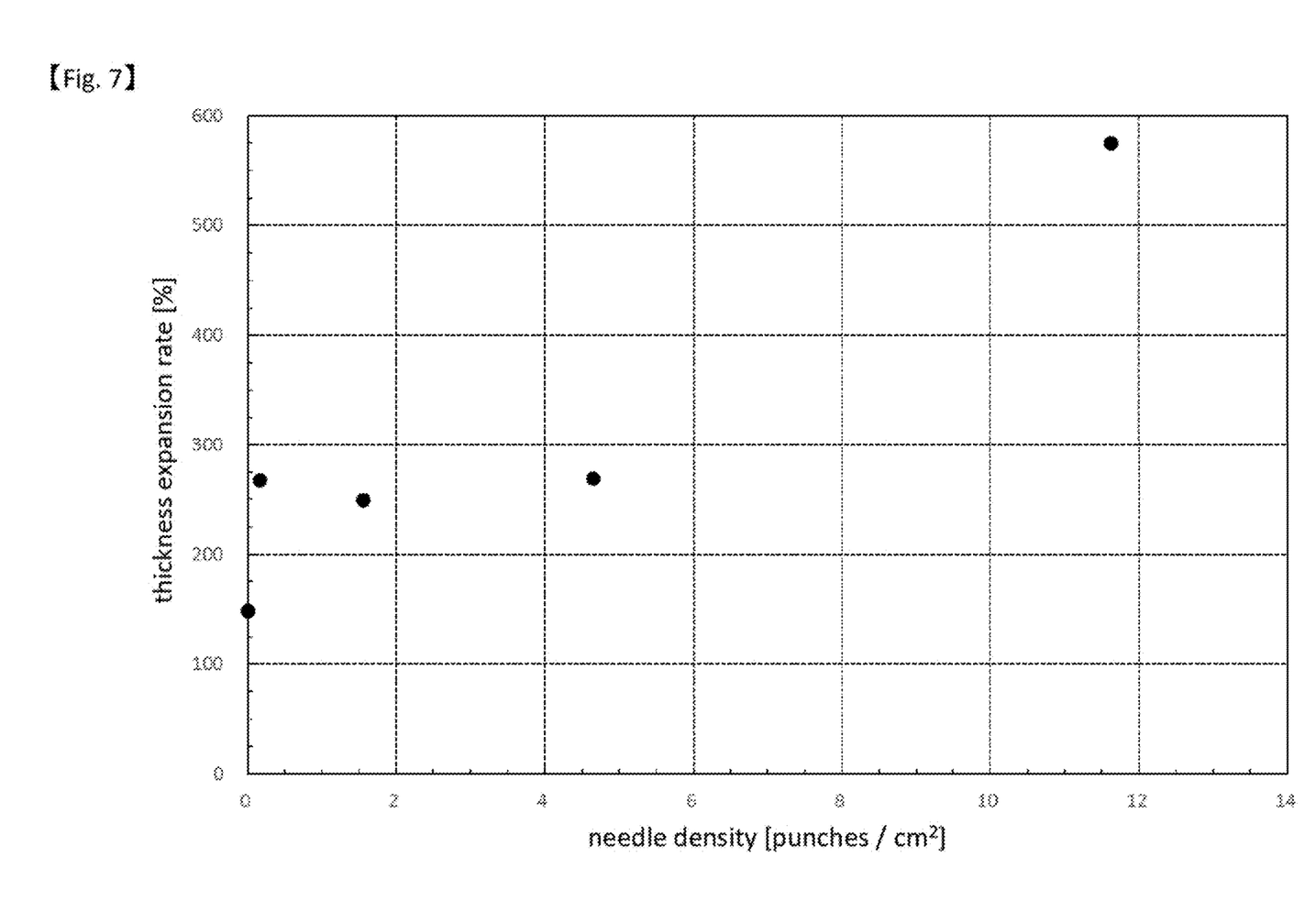
FIG. 7 is a graph showing a relationship between the thickness expansion rate and the needle punch density.

FIG. 7 is the results of the thickness expansion rate associated with varied needle density. FIG. 7 shows that when the needle density that was the number of needle punches stabbing through the sheet per unit area (1 $cm^2$) was 0 to about 5, the thickness expansion rate was 250% or less, which meant that expansion after the pre-molding treatment could be controlled. On the other hand, if the needle density was more than 5, the expansion rate was over 250%, which meant that expansion after the pre-molding treatment could not be controlled. These results show that if the density of marks made by needle punching was 5 punches/$cm^2$ or less, the thickness expansion rate was 250% or less and expansion of the prepreg sheets after the pre-molding treatment was controlled. Additionally, it is confirmed that a thickness expansion rate of the pre-molding treated prepreg sheet having about 100 threads/$cm^2$ of carbon fibers which one portion and another portion of the same thread had a gap of 1 mm or more in the thickness direction in a cross section is 250% or less, and in other words, expansion after the pre-molding could be controlled just like as ones of the present invention.

(Examination of Thickness)

Figure 8:
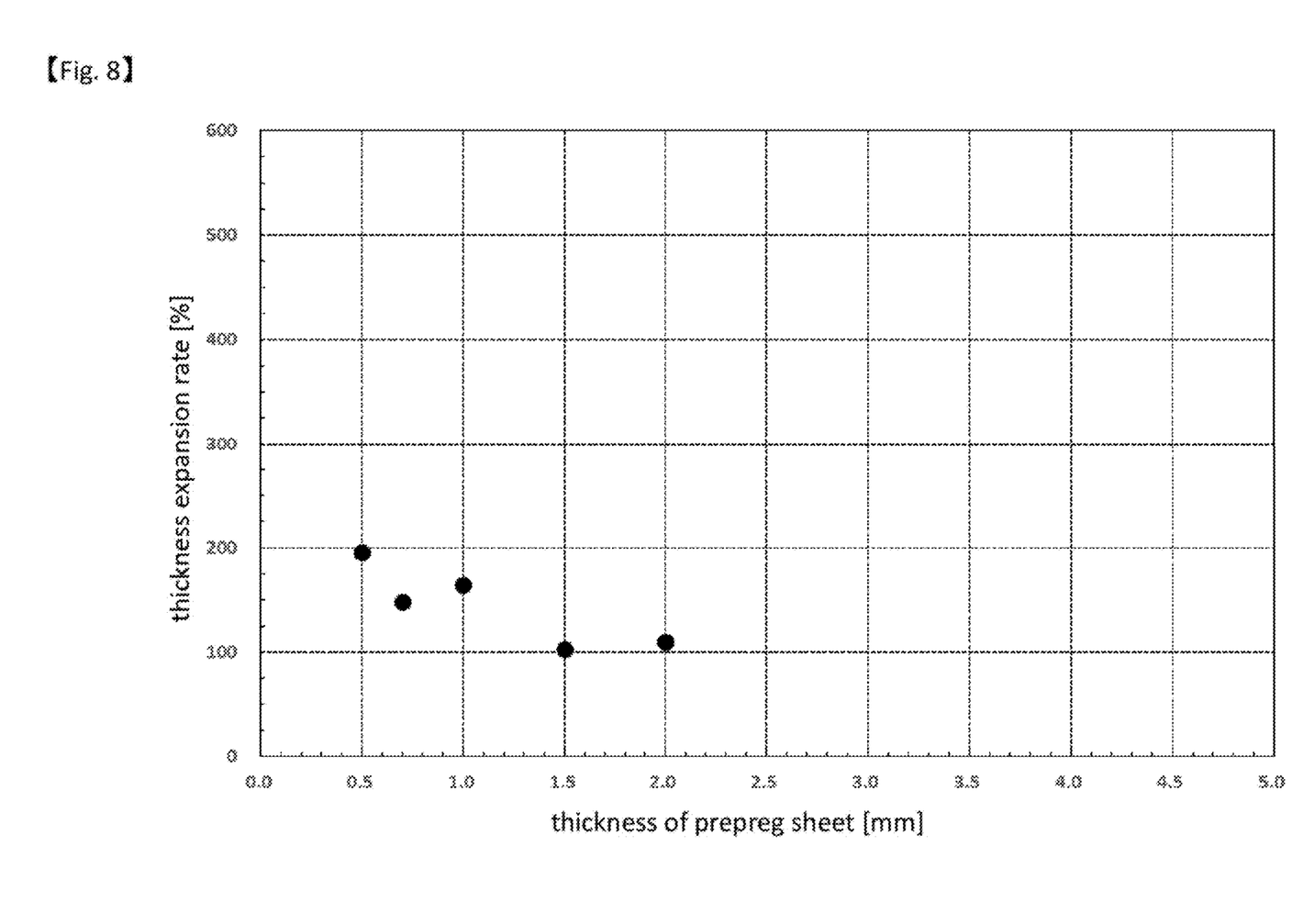
FIG. 8 is a graph showing a relationship between the thickness expansion rate and the thickness of the prepreg sheet.

Prepreg sheets were produced by following the process for producing the nonwoven fabrics of the present invention mentioned above except changing a thickness from 1.3 mm (the basis weight is constant.). By analyzing these samples, the effect of thickness of the prepreg sheets upon the thickness expansion rate was examined. FIG. 8 is the result. FIG. 8 shows that if the thickness was varied from 0.5 to 2.0 mm the thickness expansion rate tended to decline but it was 250% or less throughout the range, which meant that expansion after the pre-molding could be controlled just like as ones of the present invention.

(Examination of Fiber Length)

Figure 9:
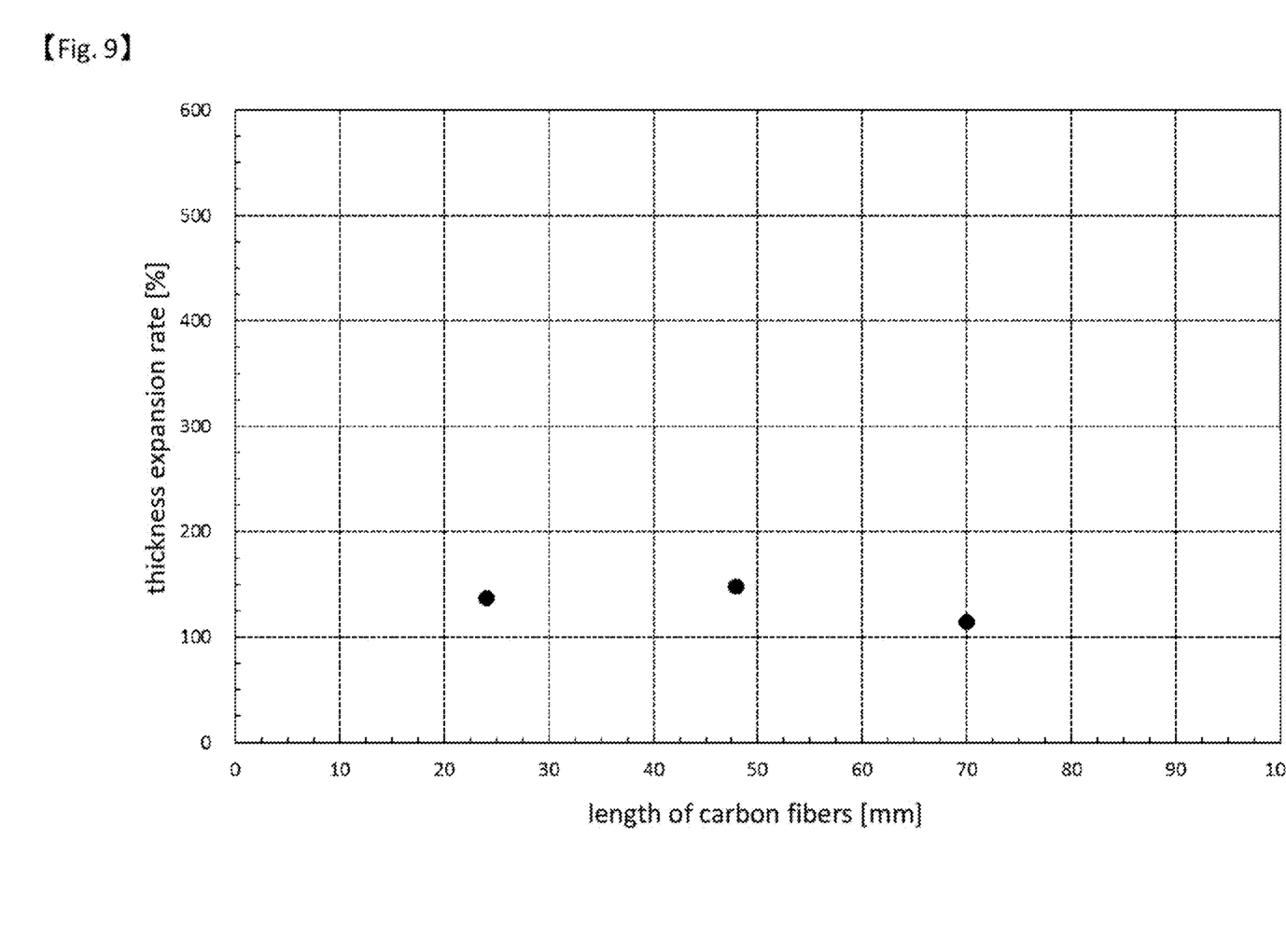
FIG. 9 is a graph showing a relationship between the thickness expansion rate of the prepreg sheet and the length of the carbon fibers.

Prepreg sheets were produced by following the process for producing the nonwoven fabrics of the present invention mentioned above except changing the average fiber length of the carbon fibers from 48 mm. By analyzing these samples, the effect of fiber length of the carbon fibers upon the thickness expansion rate was examined. FIG. 9 is the result. FIG. 9 shows that in any case where the average fiber length of the carbon fibers was 24, 48, and 70 mm, the thickness expansion rate was 250% or less, which meant that expansion after the pre-molding could be controlled just like as ones of the present invention.

(Examination of Kind of Thermoplastic Resin Fiber)

Figure 10:
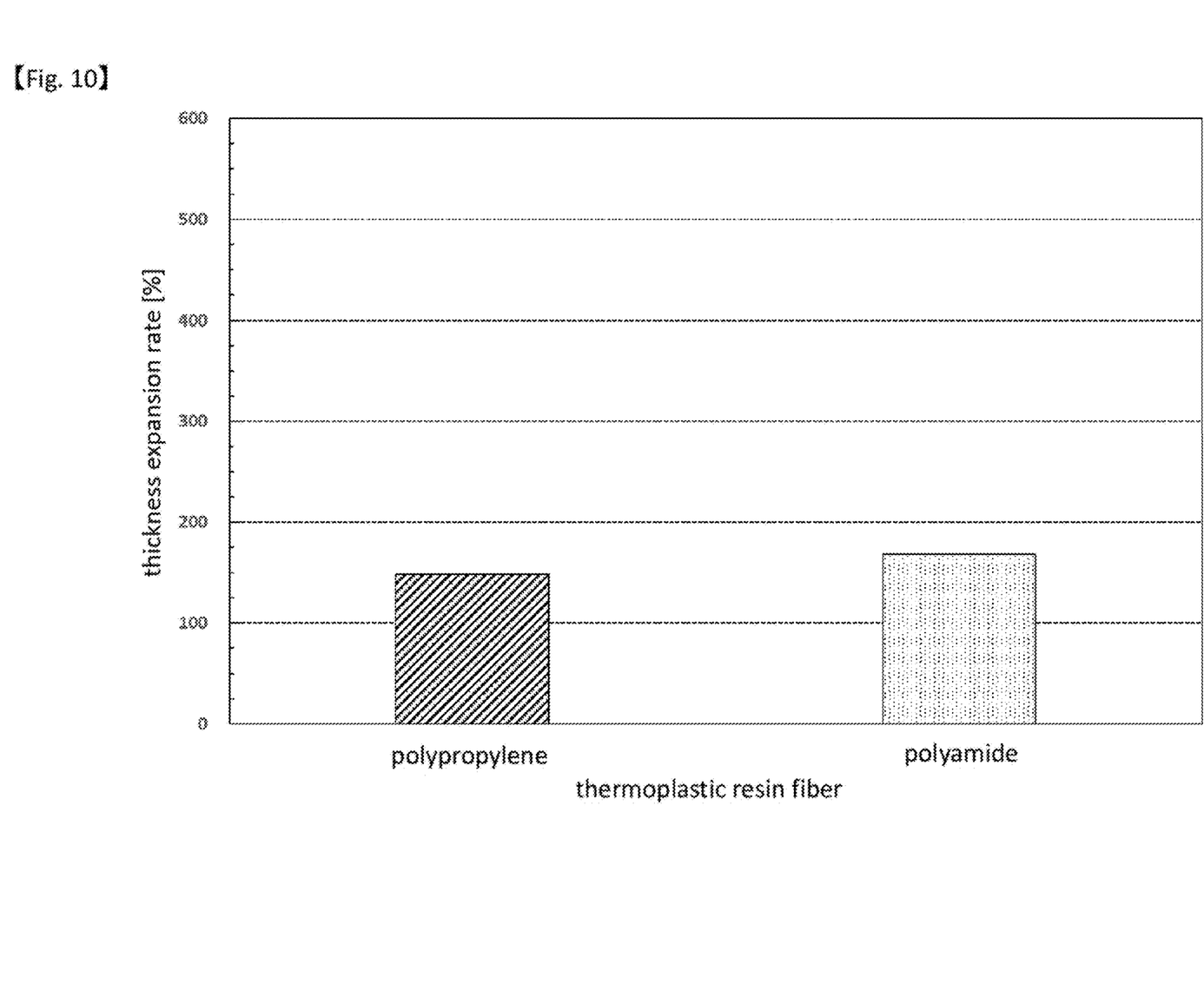
FIG. 10 is a graph showing a relationship between the thickness expansion rate of the prepreg sheet and kind of the thermoplastic resin fibers.

Prepreg sheets were produced by following the process for producing the nonwoven fabrics of the present invention mentioned above except changing kind of thermoplastic resin fiber from polypropylene to polyamide. By analyzing these samples, the effect of kind of thermoplastic resin fibers on the thickness expansion rate was examined. FIG. 10 is the result. FIG. 10 shows that when polyamide was used the thickness expansion rate was 250% or less almost the same as when polypropylene was used, which meant that expansion after the pre-molding could be controlled just like as ones of the present invention.

(Examination of Mass Ratio of Carbon Fibers and Thermoplastic Resin Fibers)

Figure 11:
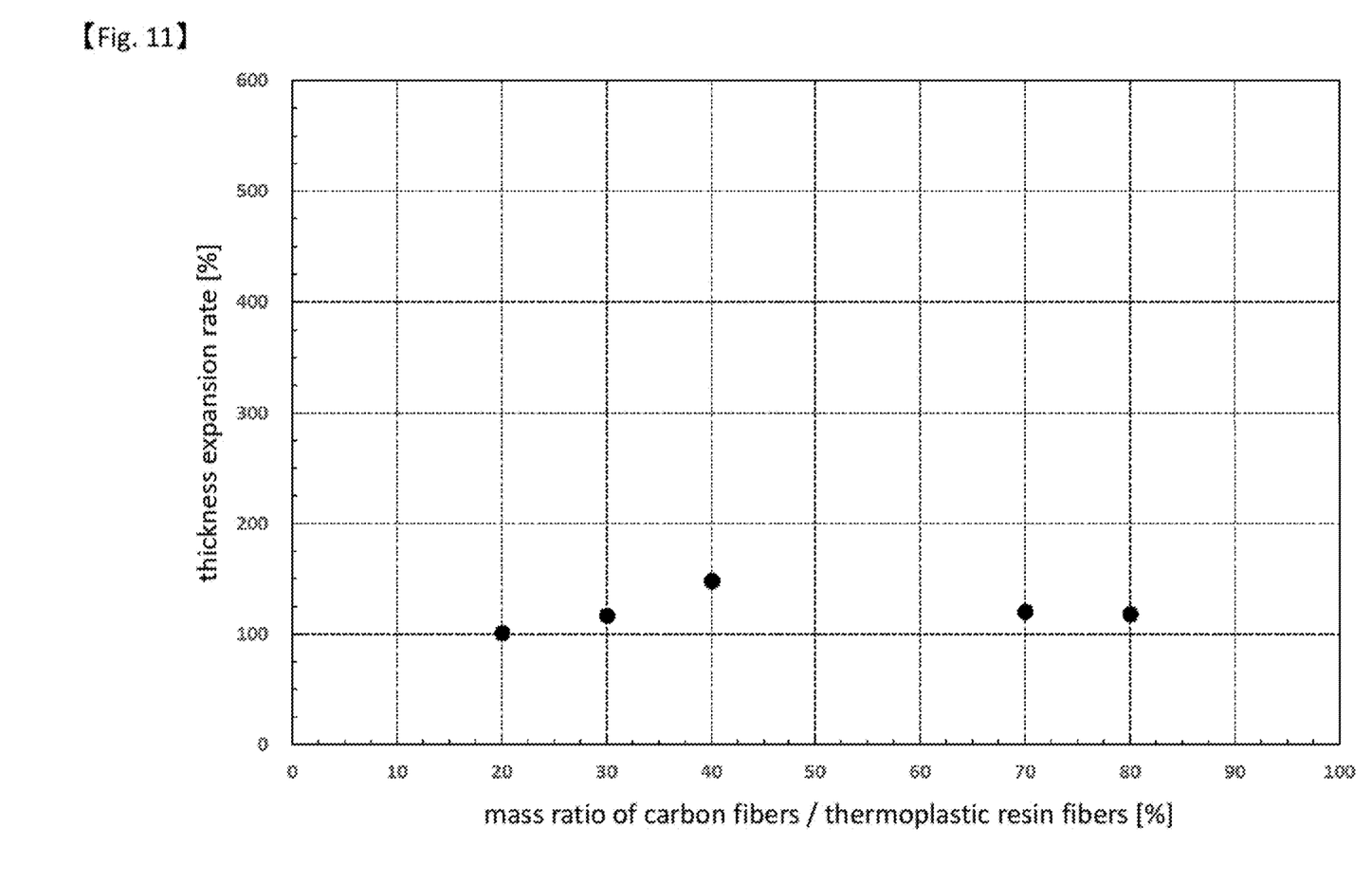
FIG. 11 is a graph showing the thickness expansion rate of the prepreg sheet and the mass ratio of the carbon fibers to the thermoplastic resin fibers.

Prepreg sheets were produced by following the process for producing the nonwoven fabrics of the present invention mentioned above except varying the mass ratio of the carbon fibers and the thermoplastic resin fibers. By analyzing these samples, the effect of the mass ratio of the carbon fibers and the thermoplastic resin fibers on the thickness expansion rate was examined. FIG. 11 is the result. FIG. 11 shows that in the range of mass ratio of 20:80 to 80:20 the thickness expansion rate was 250% or less, which meant that expansion after the pre-molding could be controlled just like as ones of the present invention.

INDUSTRIAL APPLICABILITY

Because a prepreg sheet of the present invention can control its expansion in the thickness direction when heated in the production process, the prepreg sheet can be inserted smoothly into a mold, and give desired molded articles for aerospace industry, automobile industry, sports industry, and others.

EXPLANATION OF THE SYMBOLS

1: prepreg sheet
2: carbon fiber bundles
3: carbon fibers
4: thermoplastic resin fibers
5: nonwoven fabric
6: infrared heating furnace
7: belt-press

The invention claimed is:

1. A prepreg sheet, which is an intermediate of molded articles, comprising a nonwoven fabric consisting of carbon fibers and thermoplastic resin fibers, wherein,
   the prepreg sheet has a thickness expansion rate of 250% or less after being heated for 90 seconds at a temperature of the melting point of the thermoplastic resin fibers to the melting point +100° C.

2. The prepreg sheet according to claim 1, wherein the prepreg sheet has a density of marks made by needle punching of 5 punches/cm$^2$ or less.

3. The prepreg sheet according to claim 1, wherein a density of the carbon fibers having a displacement amount of 1 mm or more is 100 threads/cm$^2$ or less in a cross section of the prepreg sheet, wherein the displacement amount is a gap in the thickness direction between one portion and another portion of a carbon fiber selected from one of the carbon fibers.

4. The prepreg sheet according to claim 1, wherein the prepreg sheet has a basis weight of 100 to 1500 g/m$^2$ and a thickness of 0.5 to 6.0 mm.

5. The prepreg sheet according to claim 1, wherein the carbon fibers have an average fiber length of 15 to 100 mm, and the thermoplastic resin fibers have an average fiber length of 25 to 100 mm.

6. The prepreg sheet according to claim 1, wherein the thermoplastic resin fibers are selected from polypropylene fibers, polyamide fibers, polycarbonate fibers, polyphenylene sulfide fibers, and polyetherimide fibers.

7. The prepreg sheet according to claim 1, wherein the carbon fibers and the thermoplastic resin fibers are mixed in a mass ratio of 20:80 to 80:20.

* * * * *